3,025,241

HIGH TEMPERATURE STABLE GREASE COMPOSITIONS THICKENED WITH TETRAIMIDES OF DIPYROMELLITIC ACID ANHYDRIDES

John L. Dreher, Berkeley, and Judson E. Goodrich, San Rafael, Calif., assignors to California Research Corporation, San Francisco, Calif., a corporation of Delaware No Drawing. Filed May 16, 1960, Ser. No. 29,179
14 Claims. (Cl. 252—51.5)

This patent application is directed to grease thickening agents particularly useful in the formation of high temperature stable grease compositions. Specifically, this patent application is directed to high temperature stable grease compositions thickened with certain imides; that is, imides produced from amines and tetracarboxylic acids.

In more recent years, it has become more and more apparent that grease compositions must be able to lubricate effectively at high temperatures, that is, temperatures in the range of 350° F. to 500+° F., preferably above 400° F. Numerous grease specifications of government agencies and industry now specify grease compositions having minimum dropping points of 400° F. The requirement of grease compositions to function as lubricants at higher temperatures is the result of increased driving power and increased speeds of automobiles and aircraft. Of particular significance is the need for high temperature greases for the lubrication of moving parts of jet engines of high speed aircraft. The increased speeds of gears, bearings, and other moving parts, the increased pressures caused by the development of smaller gears to withstand greater loads than heretofore possible with larger gears, etc., all contribute to the resulting high temperatures in moving parts.

The grease compositions described herein are beneficial in the lubrication of wearing surfaces in industrial plants wherever high temperatures and high pressures are encountered; for example, in steel mill motors and transfer table bearings, paper mill roller bearings, etc. Furthermore, in heavy automotive equipment, such as in heavy duty trucks, the wheel bearings become extremely hot during braking periods.

It is a prime necessity that grease compositions function as lubricants throughout wide ranges of temperatures and pressures.

Greases prepared according to the present invention will maintain grease consistencies at extremely high temperatures and pressures; such greases will remain unctuous and not become hard or brittle at temperatures in the range of 350° F. to 500° F.

It is a primary object of this invention to provide grease compositions which are stable at extremely high temperatures and which provide excellent lubrication at high temperatures and high pressures.

Thus, in accordance with the present invention, it has been discovered that high temperature grease compositions are formed by incorporating tetraimides of dipyromellitic acid anhydrides in oils of lubricating viscosity.

Not only do the particular polyimides of dipyromellitic acid anhydrides thicken oils of lubricating viscosity to form grease compositions having high melting points, but the grease compositions formed are also extremely resistant to oxidation and to emulsification in water.

The tetraimides of dipyromellitic acid anhydrides are illustrated by the following formula:

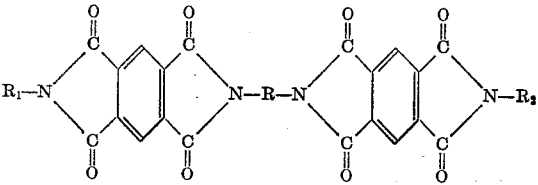

wherein R is a hydrocarbon radical selected from the group consisting of cyclic and acyclic, saturated and unsaturated hydrocarbon radicals containing from 1 to 30 carbon atoms, and $R_1$ and $R_2$ are hydrogen or cyclic and acyclic, saturated and unsaturated hydrocarbon radicals containing from 1 to 30 carbon atoms. The $R_1$ and $R_2$ radicals may or may not be identical.

For the formation of a particularly high melting grease composition imparting high resistance to wear, it is preferred that R is a benzene radical or a substituted benzene radical containing a total of from 6 to 20 carbon atoms, $R_1$ is an alkyl radical containing from 6 to 22 carbon atoms, and $R_2$ is a substituted benzene radical containing a total of from 6 to 22 carbon atoms.

More preferably, R, $R_1$ and $R_2$ hydrocarbon radicals contain a total of at least 25 carbon atoms and no more than 50 carbon atoms.

The R radical can be exemplified by phenylene, diphenylene, ethylene, propylene, octylene, octadecylene, etc.

$R_1$ and $R_2$ radicals can be exemplified by hydrogen, and the radicals: phenyl, p-tolyl, benzyl, dodecyl, tetradecyl, hexadecyl, octadecyl, etc.

When R, $R_1$ and $R_2$ radicals are derived from substituted mononuclear aromatic radicals, such as the toluidines and the phenylenediamines, it is preferred to use the para substituents rather than the ortho or meta. Less thickening agent is necessary for the preparation of the desired grease by the use of the para derivative.

The tetraimides of pyromellitic acid dianhydrides are identified as (N-hydrocarbylpyromellitdiimido-N'-hydrocarbylpyromellitdiimido)hydrocarbylenes, wherein the term "hydrocarbyl" refers to the hydrocarbon radicals $R_1$ and $R_2$ of the above formula, and the term "hydrocarbylene" refers to the hydrocarbon radical R of the above formula. Such tetraimides of pyromellitic acid dianhydrides include (N-arylpyromellitdiimido-N'-alkylpyromellitdiimido) arylene, such as (N-phenylpyromellitdiimido - N' - octadecylpyromellitdiimido)phenylene; (N - arylpyromellitdiimido-N - alkylpyromellitdiimido)-alkylene, bis-(arylpyromellitdiimido)arylene; such as bis-(N-phenylpyromellitdiimido)phenylene; bis-(N-arylpyromellitdiimido)alkylene, such as, bis-(N-phenylpyromellitdiimido)ethylene; bis-(N - alkylpyromellitdiimido) arylene, such as, bis-(N-octadecylpyromellitdiimido)-phenylene; bis-(N-alkylpyromellitdiimido)alkylene, such as, bis-(N-octadecylpyromellitdiimido)ethylene; etc.

Lubricating oils which can be used as base oils for the grease compositions described herein include a wide variety of lubricating oils, such as naphthenic base, paraffin base, and mixed base lubricating oils, other hydrocarbon lubricants, e.g., lubricating oils derived from coal products, and synthetic oils, e.g., alkylene polymers (such as polymers of propylene, butylene, etc., and the mixtures thereof), alkylene oxide-type polymers (e.g., alkylene oxide polymers prepared by polymerizing the alkylene oxide, e.g., propylene oxide, etc., in the presence of water or alcohols, e.g., ethyl alcohol), carboxylic acid esters (e.g., those which are prepared by esterifying such carboxylic acids as adipic acid, azelaic acid, suberic acid, sebacic acid, alkenyl succinic acid, fumaric acid, maleic acid, hexanoic acid, etc., with alcohols, such as butyl alcohol, hexyl alcohol, 2-ethylhexyl alcohol, dodecyl alcohol, pentaerythritol, ect.) Liquid esters of acids of phosphorus, alkyl benzenes, polyphenyls (e.g., biphenyls and terphenyls), alkyl biphenyl ethers, polymers of silicon e.g., tetraethyl silicate, tetraisopropylsilicate, tetra(4-methyl-2-tetraethyl)-silicate, hexyl(4-methyl-2-pentoxy)disiloxane, poly(methyl)siloxane, and poly(methylphenyl)siloxane, etc.

The above base oils may be used individually or in combinations thereof, wherever made miscible or wherever made so by use of mutual solvents.

The tetraimides of pyromellitic acid cianhydrides herein are used in amounts sufficient to thicken oils of lubricating viscosity to the consistency of greases. Such amounts include from 5% to 40%, by weight, more preferably from 15% to 25%, by weight.

A method of preparing these polyimides of dipyromellitic acid anhydrides is illustrated as follows: 2 mols of pyromellitic acid dianhydride are reacted with 1 mol of a diamine at room temperatures, and including temperatures ranging from 100° F. to 500° F. and higher, preferably from 300° F. to 400° F. To the resulting diimide there is added, per mol of pyromellitic acid dianhydride, 1 mol of a monoamine, which mixture is then heated to temperatures of 300° F. to 500° F. or higher.

Another method of preparing the imides of this invention involves the heating of the desired amines and the pyromellitic acid dinahydrides in proper molal proportions as a mixture of all components and heating to 300° F. to 500° F.

It is preferred to dissolve or form a slurry of the amines in a solvent, which solution, or slurry, can then be added to a lubricating oil slurry of pyromellitic acid anhydride. Solvents which can be used include ethanol, acetone, tetralin, methyl ethyl ketone, etc., or they can be reacted in an oil of lubricating viscosity to form a lubricating oil concentrate thereof. For certain particular results, it may be desirable to purify the resulting imides, or they can be used as mixtures in the formation of grease compositions.

The examples set forth hereinbelow exemplify the preparation of the pyromellitic acid anhydride imides which are the grease thickening agents described herein.

The tetraimides of dipyromellitic acid dianhydrides described herein are new compounds.

EXAMPLE I

A slurry of 23.3 grams (0.1066 mol) of pyromellitic dianhydride in 50 ml. of hot methyl ethyl ketone was added to 180 grams Hercoflex 600, which is pentaerythritol tetracaproate sold as Hercoflex 600 by Hercules Chemical Company, in a Waring Blendor and stirred at room temperature of about 150° F. A solution of 4,4'-methylenedianiline (10.6 grams, 0.0533 mol) in 25 ml. of warm methyl ethyl ketone was added to the Waring Blendor, and the whole mixture was agitated further. The custard-like product was transferred to a beaker, and 5.7 grams (0.0533 mol) of p-toluidine and 14.5 grams (.0525 mol) of Armeen 18D (octadecyl amine sold by the Armour Chemical Company) in 25 ml. warm methyl ethyl ketone was added with mechanical stirring. The mixture was heated during a period of 0.5 hour to a temperature of 400° F., followed by pan cooling. The cooled mixture was milled at 5,000 p.s.i. through an extrusion mill. The resulting grease had an unworked ASTM penetration of 231 ($P_0$=231) and an ASTM worked penetration of 295 ($P_{60}$=295). The oil separation after 30 hours at 350° F. was 5.79% and 5.22% on two separate samples. The bearing life at 350° F. was 356 hours (average of 3 runs).

Example II hereinbelow illustrates the two-step method by which the grease compositions in this invention may be prepared.

EXAMPLE II

A slurry of 23.3 grams of pyromellitic dianhydride was added to 180 grams of Hercoflex 600 in a Waring Blendor and stirred. A solution of 10.6 grams of 4,4'-methylene-dianiline in 25 ml. of hot MEK was added and stirred. The resulting product was transferred to a beaker and heated with agitation to 370° F. The product at this point was fluid. This product was cooled to 150° F., at which temperature there was added 5.7 grams of p-toluidine and 14.5 grams of Armeen 18D in 30 ml. of hot MEK. The resulting mixture was heated to 400° F. This product was pan cooled and milled at 5,000 p.s.i. through an extrusion mill. The resulting grease had an ASTM unworked penetration of 268 and a worked penetration at 60 strokes of 344.

EXAMPLE III

A mixture of 760 grams (7.10 mols) of p-toluidine and 1,745 grams (6.32 mols) of Armeen 18D was heated to form a melt, after which there was added to the melt 698 grams (6.46 mols) of paraphenylenediamine and approximately 1,000 grams of Hercoflex 600. This fluid blend was then added to a grease kettle containing a mixture of 11,605 grams of Hercoflex 600, 2,820 grams (12.92 mols) of pyromellitic dianhydride in 1500 ml. of MEK which had been blended and agitated at room temperature. The whole mixture was heated to 180° F. at which temperature recycling of the mixture through a gear pump was begun. The whole mixture was then heated to 300° F., at which temperature there was added oxidation inhibitors. The mixture was heated to 400° F., then recycled through a Manton-Gaulin homogenizer at 4,000 p.s.i. While the mixture was cooling, there was added approximately 10,605 grams of Hercoflex 600. The resulting grease composition was drawn from the kettle at 120° F. through a 120 mesh filter. The ASTM unworked penetration was 227. The worked penetration values were: $P_{60}$=280, and $P_{100,000}$=334.

The final grease composition contained 18.4% of the polyimide of the pyromellitic acid dianhydride.

Table I hereinbelow sets forth test data obtained by grease compositions thickened with polyimides of dipyromellitic acid dianhydrides described hereinabove. The R, $R_1$ and $R_2$ of the table identify the radicals of the formula set forth hereinabove.

Base oil A was a California paraffinic base oil having a viscosity of 480 SSU at 100° F.

Base oil B was a polymethylphenylsiloxane wherein the methylphenyl ratio had a value of about 0.4. This base oil is further identified as DC–550, which is sold as such by the Dow Corning Corporation, Midland, Michigan.

Base oil C was Hercoflex 600, that is, pentaerythritol tetracaproate, sold by Hercules Powder Company.

Base oil D was Emery 907-S, further identified as tridecyl azelate, sold by Emery Industries., Inc., Cincinnati, Ohio.

The "thin film test" measured the ability of the grease composition to maintain grease-like characteristics, particularly, the retention of pliability and resistance to oxidation under exposure of a thin film of grease to high temperatures. This test also indicated other grease characteristics, such as tendency to bleed, flake, and become tacky. The thin film test was run as follows: The grease to be tested was coated on a metal strip, the grease coating being of uniform dimensions: 1/32" thick, 7/8" wide and 2½" long. This grease sample was placed in an oven at 350° F. and observed at periodic intervals until the sample no longer existed as a grease. The "life" of the grease was the number of hours during which the grease could be so heated before it lost its grease-like characteristics, that is, the time at which the test sample became hard and brittle.

The "bearing life" for a particular grease composition was determined by the following test procedure which is known as the Navy high speed bearing test as described in Federal Test Method 331.1. In this test, a ball bearing was operated at 10,000 r.p.m. continuously for approximately 22 hours at the temperature noted in the table. The apparatus was then cooled to room temperature during a period of 2 hours. This procedure of operation at 10,000 r.p.m. at the noted temperature and cooling was repeated until there was bearing failure.

The oil separation test was run by the procedure described in the FED-STD-791 Method No. 321. In this test 10 g. of grease was weighed into a wire gauze cone. The cone was suspended over a tarred beaker and placed in an oven at 350° F. for 30 hours. The beaker was cooled and weighed to determine the amount of oil which had separated.

hereinabove. The diimide was removed from the grease composition by solvent wash to remove all the oils therefrom, and the neutral compound separated from the basic salt washes was isolated and analyzed as follows:

Table III

| Percent | Found | Theory |
|---|---|---|
| C | 70.6 | 72.2 |
| H | 6.4 | 6.1 |
| N | 6.8 | 6.6 |
| O[1] | 15.4 | 15.1 |
| [2] | 0.8 | |
| | 100.0 | 100.0 |

[1] By difference.
[2] Ash.

In addition to the thickening agents described herein, the grease compositions of this invention may contain other grease thickening agents, oiliness agents, extreme Table I

| $R_1$, R and $R_2$ Radicals Derived From— | | | Base Oil | Amt. of Thickener (Wt. percent) | Other Additives (Wt. percent) | ASTM Penetration | | Dropping Point °F. | Thin Film Life 300° F. (Hours) | Bearing Life | |
|---|---|---|---|---|---|---|---|---|---|---|---|
| $R_1$ | R | $R_2$ | | | | $P_0$ | $P_{60}$ | | | Temp. | Hrs. |
| p-toluidine | p-phenylenediamine | p-toluidine | A | 24.0 | 0 | 308 | 315 | 580+ | | | |
| octyldecylamine | do | octadecylamine | A | 16.0 | [1] 5 | 239 | 269 | | | 350 | [2] 216 |
| p-toluidine | do | do | B | 25.0 | 0 | 251 | 303 | | | 450 | [3] 124 |
| Do | do | p-toluidine | B | 24.0 | 0 | 316 | 341 | | | 450 | [3] 115 |
| Do | do | do | C | 22.8 | [1] 4.2 | 265 | 303 | 580+ | 140 | 350 | [2] 216 |
| Do | do | octadecylamine | C | 19.7 | 0 | 267 | 290 | 580+ | 88 | 350 | [3] 48 |
| Do | ethylenediamine | do | C | 21.7 | 0 | 358 | 509+ | 580+ | | | |
| Do | diethylenetriamine | do | C | 20.6 | [1] 5.0 | 437 | 509+ | | | | |
| Do | benzoquanamine | do | C | 20.6 | [1] 5.0 | 401 | 509+ | | | | |
| Do | hydrazine | do | C | 20.6 | [1] 5.0 | 312 | 405 | | | | |
| Do | benzidine | do | C | 20.6 | [1] 5.0 | 302 | 342 | | | | |
| Do | methylenedianiline | do | C | 20.6 | [1] 5.0 | 231 | 295 | 580+ | | 350 | [2] 356 |
| Do | p-phenylenediamine | do | C | 17.6 | [1] 1.9 | 261 | 296 | 580+ | [3] 277 | 350 | [3] 692 |
| Do | do | do | D | 17.6 | [1] 2.0 | 263 | 303 | | 281 | 350 | [3] 433 |
| Do | do | p-toluidine | C | 22.8 | [1] 4.2 | 265 | 303 | 580+ | 140 | 350 | [2] 216 |

[1] An oxidation inhibitor  [2] Average of 3 tests  [3] Average of 2 tests

Table II

| $R_1$ Derived From | R Derived From | $R_2$ Derived From | Base Oil | Amt. of Thickener (Wt. Percent) | Other Additives (Wt. Percent) | ASTM Penetration | | Dropping Point, °F. |
|---|---|---|---|---|---|---|---|---|
| | | | | | | $P_0$ | $P_{60}$ | |
| Octadecylamine | p-phenylenediamine | Octadecylamine | C | 17.0 | [1] 5.0 | 280 | 311 | 580+ |
| p-toluidine | do | do | C | 20.6 | [1] 5.0 | 253 | 290 | 580+ |
| Do | o-phenylenediamine | do | C | 20.6 | [1] 5.0 | 338 | 509+ | 500 |
| Do | m-phenylenediamine | do | C | 20.6 | [1] 5.0 | 278 | 342 | 580+ |
| Do | o-toluidine | do | C | 20.6 | [1] 5.0 | 279 | 323 | |
| Do | p-phenylenediamine | dodecylamine | C | 20.6 | [1] 5.0 | 273 | 316 | |
| benzylamine | do | Octadecylamine | C | 20.6 | [1] 5.0 | 234 | 285 | |
| Alkylaniline | do | Alkylaniline [2] | C | 20.6 | [1] 2.0 | 290 | 362 | 580+ |
| Aniline | methylenedianiline | Octadecylamine | C | 20.6 | [1] 2.0 | 244 | 326 | |
| p-toluidine | 2,6-diaminopyridine | do | C | 20.6 | [1] 2.0 | 258 | 346 | 580+ |
| Do | p,p'-sulfonyldianiline (4,4'-diaminodiphenyl sulfone). | do | C | 20.6 | [1] 2.0 | 239 | 315 | |
| Do | methylenedianiline | [3] | C | 20.6 | [1] 2.0 | 399 | 509+ | |

[1] An oxidation inhibitor.
[2] Alkyl radical containing 12 carbon atoms.
[3] Rosin Amine D-Hercules Powder Co.

The particular tetraimides of dipyromellitic acid dianhydride described hereinabove as grease thickeners are new compounds. A grease thickened with the compound, p-(N-p'-tolylpyromellitdiimido - N' - octadecylpyromellitdiimido)benzene, was prepared according to Example I pressure agents, oxidation inhibitors, rust inhibitors, corrosion inhibitors, viscosity index improving agents, dyes, etc.

We claim:
1. A grease composition comprising a major proportion of an oil of lubricating viscosity, and from about 5% to about 40%, by weight, of (N-arylpyromellitdiimido-N'-alkylpyromellitdiimido)arylene, wherein said aryl radical is selected from the group consisting of a benzene radical and substituted benzene radicals containing a total of 6–20 carbon atoms, said alkyl radical contains from 6–22 carbon atoms, and said arylene radical is a phenylene radical.

2. A grease composition comprising a major proportion of an oil of lubricating viscosity, and from about 5% to about 40%, by weight, of (N-arylpyromellitdiimido-N'-alkylpyromellitdiimido)alkylene, wherein said aryl radical is selected from the group consisting of a benzene radical and substituted benzene radicals containing a total of 6–20 carbon atoms, said alkyl radical contains from 6–22 carbon atoms, and said alkylene radical is selected from the group consisting of ethylene radical and propylene radical.

3. A grease composition comprising a major proportion of an oil of lubricating viscosity, and from about 5% to about 40%, by weight, of bis-(N-arylpyromellitdiimido)arylene, wherein said aryl radical is selected from the group consisting of a benzene radical and substituted benzene radicals containing a total of 6–20 carbon atoms, and said arylene radical is a phenylene radical.

4. A grease composition comprising a major proportion of an oil of lubricating viscosity, and from about 5% to about 40%, by weight, of bis-(N-arylpyromellitdiimido)alkylene, wherein said aryl radical is selected from the group consisting of a benzene radical and substituted benzene radicals containing a total of 6–20 carbon atoms, and said alkylene radical is selected from the group consisting of ethylene radical and propylene radical.

5. A grease composition comprising a major proportion of an oil of lubricating viscosity, and from about 5% to about 40%, by weight, of bis-(N-alkylpyromellitdiimido)arylene, wherein said alkyl radical contains from 6–22 carbon atoms, and said arylene radical is a phenylene radical.

6. A grease composition comprising a major proportion of an oil of lubricating viscosity, and from about 5% to about 40%, by weight, of bis-(N-alkylpyromellitdiimido)alkylene, wherein said alkyl radical contains from 6–22 carbon atoms, and said alkylene radical is selected from the group consisting of ethylene radical and proylene radical.

7. A grease composition comprising a major proportion of an oil of lubricating viscosity, and from 5% to 40%, by weight, of an (N-p-tolyl pyromellitdiimido-N'-octadecyl)p-phenylene.

8. A grease composition comprising a major proportion of an oil of lubricating viscosity, and from 5% to 40%, by weight, of an (N-p-tolyl pyromellitdiimido-N'-octadecyl)ethylene.

9. A grease composition comprising a major proportion of an oil of lubricating viscosity, and from 5% to 40%, by weight, of an (N-p-tolyl pyromellitdiimido-N'-tolyl)p-phenylene.

10. A grease composition comprising a major proportion of an oil of lubricating viscosity, and from 5% to 40%, by weight, of an (N-p-octadecyl pyromellitdiimido-N'-octadecyl)p-phenylene.

11. A grease composition comprising a major proportion of an oil of lubricating viscosity, and from 5% to 40%, by weight, of an (N-p-tolyl pyromellitdiimido-N'-tolyl)ethylene.

12. A grease composition comprising a major proportion of an oil of lubricating viscosity, and from 5% to 40%, by weight, of an (N-p-octadecyl pyromellitdiimido-N'-octadecyl)ethylene.

13. A grease composition comprising a major proportion of a petroleum lubricating oil, and from 5% to 40% of an (N-hydrocarbylpyromellitdiimido-N'-hydrocarbylpyromellitdiimido)hydrocarbylene of the formula

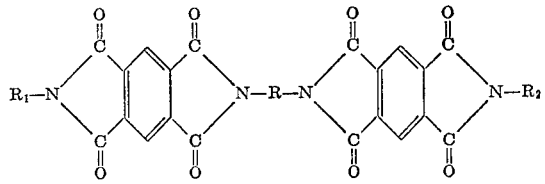

wherein R is a hydrocarbon radical containing from 1 to 30 carbon atoms, and $R_1$ and $R_2$ are selected from the group consisting of hydrogen and hydrocarbon radicals containing from 6 to 22 carbon atoms.

14. A grease composition comprising a major proportion of a base oil consisting essentially of pentaerythritol tetracaproate, and from 15% to 25% of an (N-hydrocarbylpyromellitdiimido - N' - hydrocarbylpyromellitdiimido)hydrocarbylene of the formula

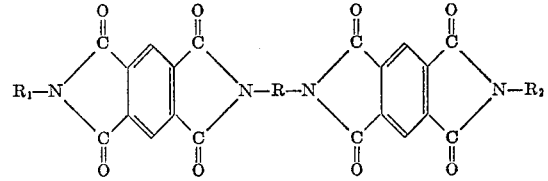

wherein R is a hydrocarbon radical containing from 1 to 30 carbon atoms, and $R_1$ and $R_2$ are selected from the group consisting of hydrogen and hydrocarbon radicals containing from 6 to 22 carbon atoms.

References Cited in the file of this patent

UNITED STATES PATENTS 2,547,496    Rowland _____ Apr. 3, 1951

FOREIGN PATENTS 762,152    Great Britain _____ Nov. 21, 1956